United States Patent
Heeter

(10) Patent No.: US 10,655,500 B2
(45) Date of Patent: May 19, 2020

(54) REINFORCED FAN CONTAINMENT CASE FOR A GAS TURBINE ENGINE

(71) Applicant: Rolls-Royce Corporation, Indianapolis, IN (US)

(72) Inventor: Robert W. Heeter, Noblesville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 818 days.

(21) Appl. No.: 15/351,009

(22) Filed: Nov. 14, 2016

(65) Prior Publication Data

US 2018/0230855 A1 Aug. 16, 2018

Related U.S. Application Data

(63) Continuation-in-part of application No. 15/257,206, filed on Sep. 6, 2016.

(51) Int. Cl.
*F01D 25/24* (2006.01)
*B32B 3/12* (2006.01)
(Continued)

(52) U.S. Cl.
CPC .............. *F01D 25/24* (2013.01); *B29C 70/00* (2013.01); *B32B 3/12* (2013.01); *B32B 5/02* (2013.01);
(Continued)

(58) Field of Classification Search
CPC ................................ F01D 25/24; F01D 21/045
(Continued)

(56) References Cited

U.S. PATENT DOCUMENTS 6,652,222 B1 * 11/2003 Wojtyczka ................ B32B 3/12
415/200
6,814,541 B2 11/2004 Evans et al.
(Continued)

FOREIGN PATENT DOCUMENTS

EP           2 495 400      9/2012
JP           H10158417      11/1996
WO       WO 2012/065155    5/2012

OTHER PUBLICATIONS

Pereira, J. Michael, et al., "Ballistic Impact Response of Kevlar 49 and Zylon Under Conditions Representing Jet Engine Fan Containment", and Abstract, (Jan. 1, 2007), NASA Technical Reports Server (NTRS) URL: http://ntrs.nasa.gov/search.jsp?print—yes&R=20080013150, (PDF printed Sep. 6, 2016) (11 pages).
(Continued)

*Primary Examiner* — Justin D Seabe
*Assistant Examiner* — Cameron A Corday
(74) *Attorney, Agent, or Firm* — McCracken & Gillen LLC

(57) ABSTRACT

A fan containment case for a gas turbine engine is provided which includes a barrel having an outermost portion, an innermost portion, and an interior portion in-between the outermost portion and the innermost portion. The outermost portion has an outermost band of material made of carbon fiber composite and the innermost portion has an innermost band of material made of carbon fiber composite. The interior portion includes a first interior band and a second interior band adjacent the first interior band. The first interior band is made of poly p-phenylene-2,6-benzobisoxazole (PBO) and the second interior band is made of an aramid material. The innermost portion has an innermost band of material made of carbon fiber composite.

18 Claims, 9 Drawing Sheets

(51) Int. Cl.
*B32B 5/02* (2006.01)
*F01D 21/04* (2006.01)
*B29C 70/00* (2006.01)
*D03D 1/00* (2006.01)
*F02K 3/06* (2006.01)
*F04D 29/52* (2006.01)

(52) U.S. Cl.
CPC .............. *D03D 1/00* (2013.01); *F01D 21/045* (2013.01); *B32B 2250/40* (2013.01); *B32B 2250/42* (2013.01); *B32B 2262/02* (2013.01); *B32B 2262/106* (2013.01); *B32B 2307/558* (2013.01); *B32B 2605/18* (2013.01); *F02K 3/06* (2013.01); *F04D 29/526* (2013.01); *F05D 2240/14* (2013.01); *F05D 2250/283* (2013.01); *F05D 2300/224* (2013.01); *F05D 2300/433* (2013.01); *F05D 2300/603* (2013.01); *Y02T 50/672* (2013.01)

(58) Field of Classification Search
USPC .............................................................. 415/9
See application file for complete search history.

(56) References Cited

U.S. PATENT DOCUMENTS

| | | | |
|---|---|---|---|
| 8,016,543 | B2 | 9/2011 | Braley et al. |
| 8,021,102 | B2 | 9/2011 | Xie et al. |
| 8,827,629 | B2 | 9/2014 | Voleti et al. |
| 2006/0092847 | A1 | 5/2006 | Hornick et al. |
| 2006/0093847 | A1* | 5/2006 | Hornick ................ F01D 21/045 428/523 |
| 2006/0252334 | A1 | 11/2006 | LoFaro et al. |
| 2007/0081887 | A1 | 4/2007 | Xie et al. |
| 2008/0145215 | A1 | 6/2008 | Finn et al. |
| 2008/0206048 | A1 | 8/2008 | Coupe et al. |
| 2011/0052382 | A1 | 3/2011 | Cheung |
| 2014/0003923 | A1 | 1/2014 | Finnigan et al. |

OTHER PUBLICATIONS

Xie, Ming, "Intelligent Engine Systems, Smart Case System", NASA/CR-2008-215233, May 2008, and Abstract (May 1, 2008), NASA Technical Reports Server (NTRS) URL: http://ntrs.nasa.gov/search.jsp?print=yes&R=20080023404, (PDF printed Sep. 6, 2016) (39 pages).

Extended European Search Report dated Feb. 8, 2018, for European application No. 17186115.6-1006, Applicant, Rolls-Royce Corporation (13 pages).

Extended European Search Report dated Feb. 8, 2018, for European application No. 17184680.1-1006, Applicant, Rolls-Royce Corporation (13 pages).

Chin, et al., "Temperature and humidity aging of poly(p-phenylene-2,6-benzobisoxazole) fibers: Chemical and physical characterization", Polymer Degradation and Stability, vol. 92, Issue 7, Jul. 2007, pp. 1234-1246, Downloaded from: http://www.pcnr.nist.gov/programs/sans/pdf/publications/0599.pdf (13 pages).

* cited by examiner

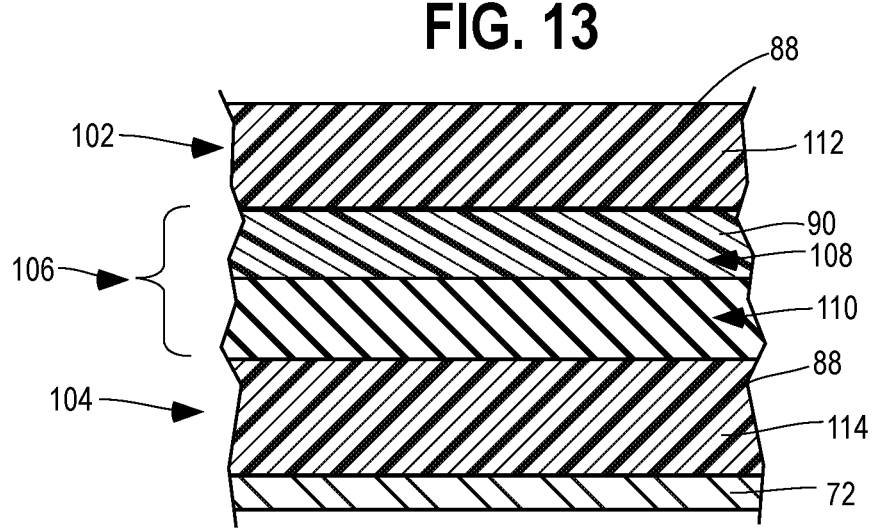
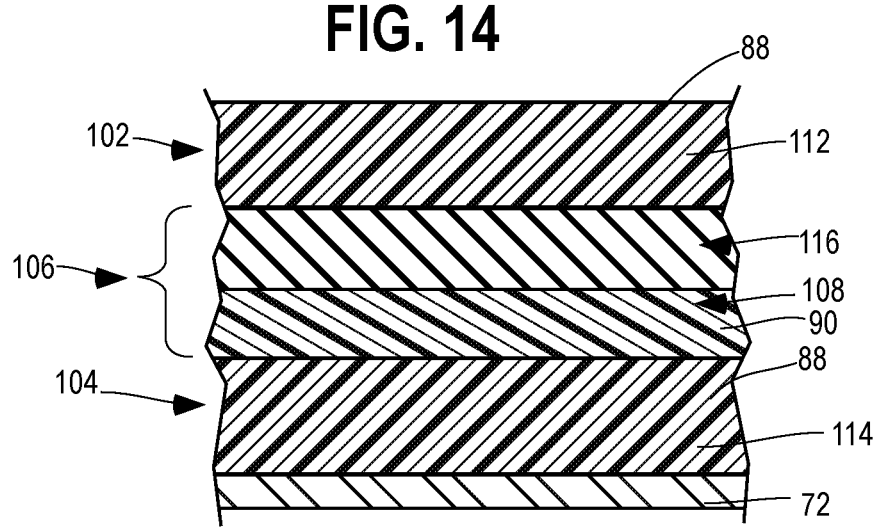

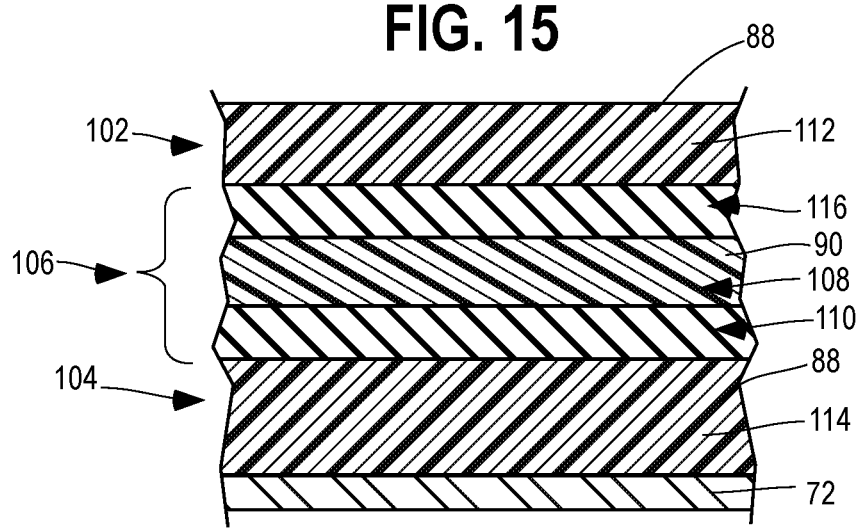
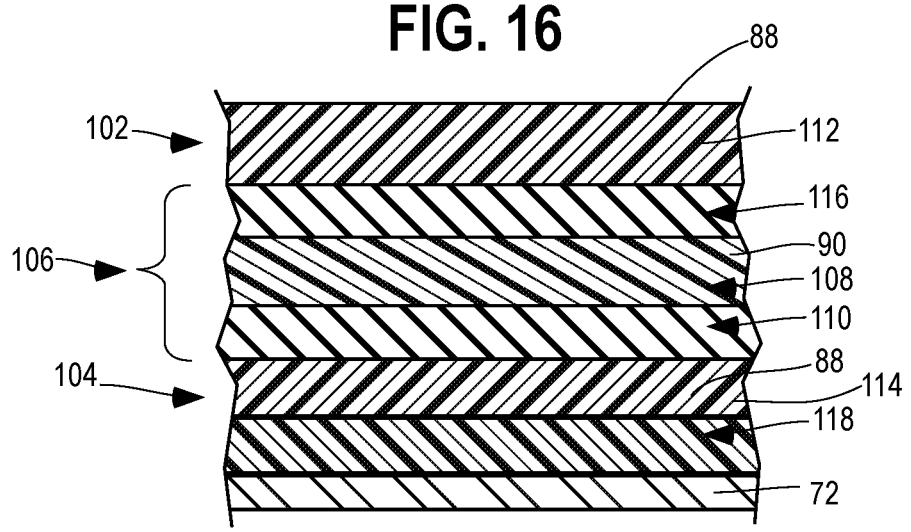

REINFORCED FAN CONTAINMENT CASE FOR A GAS TURBINE ENGINE

CROSS REFERENCE TO RELATED APPLICATIONS

This patent application claims the benefit of and is a continuation-in-part of U.S. patent application Ser. No. 15/257,206 filed, Sep. 6, 2016, and incorporates by reference the disclosures of such application by reference herein.

REFERENCE REGARDING FEDERALLY SPONSORED RESEARCH OR DEVELOPMENT

Not applicable

SEQUENTIAL LISTING

Not applicable

FIELD OF DISCLOSURE

The present disclosure generally relates to gas turbine engines. More particularly, but not exclusively, the present disclosure relates to fan containment cases for gas turbine engines.

BACKGROUND

Gas turbine engines include a fan having fan blades in front of the engine. The fan may be contained in a hardwall fan containment case. During operation any one of the fan blades may break off from the fan and impact the hardwall fan containment case. This is generally referred to as fan blade-off (FBO). After a turbine engine fan loses a blade, the loads on the fan case rise well above those experienced in normal flight conditions because of the fan imbalance. During engine shut down, which is typically about a few seconds, cracks can propagate rapidly in the hardwall fan case from the damage caused by the impact of the FBO. If the hardwall fan case fails completely, then the consequences for the engine and aircraft could be catastrophic.

The hardwall fan case is generally made of titanium and is designed to stop a broken blade. Titanium or other metal in a hardwall fan case further increase the weight of the gas turbine engine. Thus, there is a need for a lighter hardwall fan case without compromising a structural strength of the fan case to withstand an impact of a FBO.

SUMMARY

According to one aspect, a fan containment case for a gas turbine engine having a barrel comprising an outermost portion, an innermost portion, and an interior portion in-between the outermost portion and the innermost portion is provided. An outermost band of material of the outermost portion is provided, wherein the outermost band is made of carbon fiber composite. A first interior band and a second interior band of the interior portion is provided, wherein the second interior band is adjacent the first interior band. The first interior band is made of poly p-phenylene-2,6-benzobisoxazole (PBO) and the second interior band is made of an aramid material. An innermost band of material of the innermost portion is also provided, wherein the innermost band is made of carbon fiber composite.

According to another aspect, a gas turbine engine having a fan containment case including a barrel comprising an outermost portion, an innermost portion, and an interior portion in-between the outermost portion and the innermost portion is provided. An outermost band of material of the outermost portion is provided, wherein the outermost band is made of carbon. A first interior band and a second interior band of the interior portion is provided, wherein the second interior band is adjacent the first interior band. The first interior band is made of poly p-phenylene-2,6-benzobisoxazole (PBO) and the second interior band is made of an aramid material. An innermost band of material of the innermost portion is also provided, wherein the innermost band is made of carbon.

BRIEF DESCRIPTION OF THE DRAWINGS

FIGS. 13-15 depict an enlarged, fragmentary, cross sectional view along a plane P in FIG. 12 in a radial direction of a barrel having a three-portion arrangement of carbon as outermost and innermost portions and variations of configurations of PBO and para/meta aramid as an interior portion; and FIG. 16 depicts another aspect of the variation shown in FIG. 15 with an additional PBO layer inboard of the innermost portion made of carbon.

DETAILED DESCRIPTION

There are at least two types of fan containment cases utilized in gas turbine engine technology. One is a softwall fan containment case and the other is a hardwall fan containment case. Both of the softwall and hardwall fan cases include a barrel and may include a fan track liner that surround a rotor having fan blades. Each of the softwall and hardwall fan cases is constructed for a different purpose. A softwall fan case is intended to allow a high energy debris such as a portion of the broken off fan blade to penetrate through the fan track liner and the barrel. In the softwall fan cases, the barrel is wrapped by a containment blanket and the high energy debris that penetrates through the fan track liner and the barrel is caught and contained by the containment blanket. The barrel may be metallic, such as aluminum, or composite, and the containment blanket may be made of dry fabric wrap comprising an aramid fiber such as Kevlar™. The fan track liner may be comprised of an abradable material such as polymer, an epoxy, and/or a honeycomb material or other suitable material. The fan blades may be made of a metal, such as titanium, or an alloy of various metals or be of composite construction. The barrel may sustain significant damage (including cracks and/or holes) from a FBO event. The fan track liner and the containment blanket are disposed radially away from an axial fluid flow path through the fan and more specifically, the fan track liner is disposed between the barrel and the fluid flow path. The barrel forms a structure between the fan track liner and the containment blanket.

Hardwall fan containment cases are intended to strictly contain the high energy debris projectiles within the fan case and minimize the penetration of broken off fan blades into the barrel. As such, the hardwall fan case may not include a wrapped containment blanket around and on the outside surface of the barrel. In a FBO event, the broken off and fast moving fan blade may cut through the fan track liner but it should not penetrate through the barrel and instead it should be contained and confined within the interior of the barrel. The present disclosure is directed to and describes an embodiment of the hardwall fan case although it may also have applications for softwall fan case arrangements.

Figure 1:
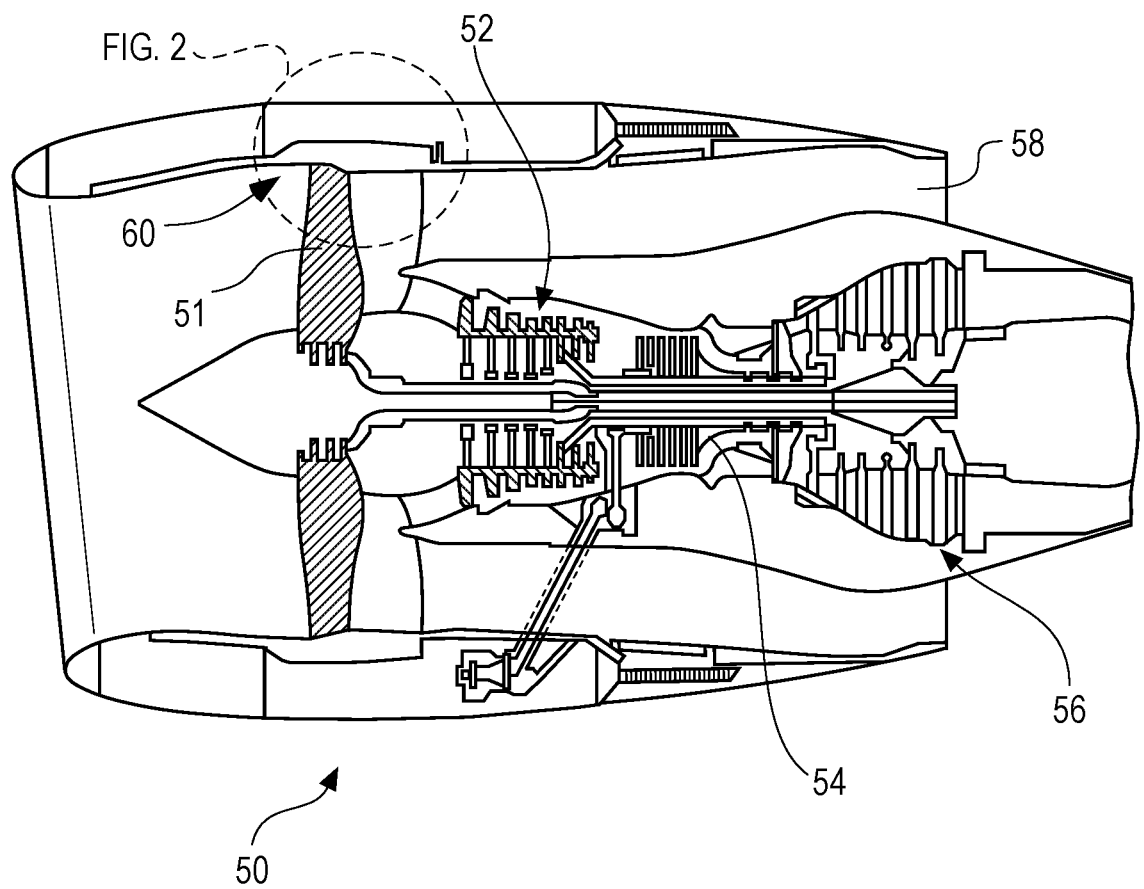
FIG. 1 depicts a side sectional view of a turbine engine including a hardwall fan containment case.

Referring to FIG. 1, a gas turbine engine 50 is illustrated having a fan 51, a compressor section 52, a combustor 54, and a turbine section 56, which together can be used to generate useful power. Air enters the gas turbine engine 50, is compressed through the action of the compressor 52, mixed with fuel, and combusted in the combustor 54. The turbine 56 is arranged to receive a fluid flow such as a combusted mixture of air and fuel from the combustor 54 and extract useful work from the fluid flow. The gas turbine engine 50 may have a hardwall fan containment case 60 and can be used to power for example, aircraft such as airplanes and unmanned space vehicles. Further, the present disclosure contemplates utilization of the hardwall fan containment case 60 in other applications that may not be aircraft related such as industrial applications, power generation, pumping sets, naval propulsion, weapon systems, security systems, perimeter defense/security systems, and the like known to one of ordinary skill in the art.

Figure 2:
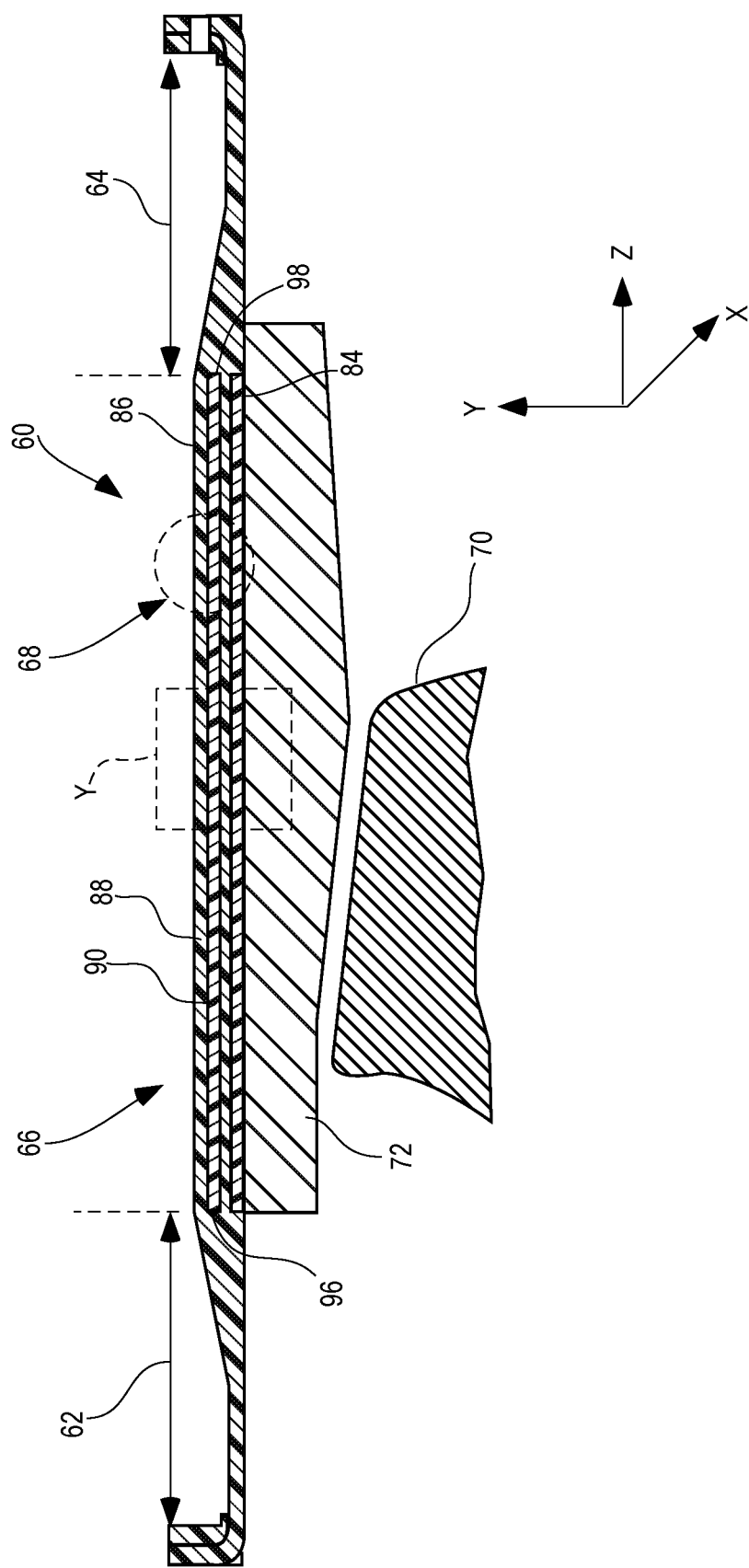
FIG. 2 depicts a cross sectional detailed view of an embodiment of the hardwall fan containment case of FIG. 1.

Referring to FIG. 2, one embodiment of a hardwall fan containment case (fan case) 60 includes a barrel 68 and a fan track liner 72. The barrel 68 has a forward portion 62 and an aft portion 64 and a middle portion 66 in between the forward portion 62 and the aft portion 64. The hardwall fan case 60 is located outboard of rotor fan blades 70. The relative positions of components are described with reference to the axis of rotation of the turbofan engine. The axial direction is denoted by Z, the radial direction is denoted by Y, and the tangential direction is denoted by X. In this example, the barrel 68 has an inboard innermost surface 84, and an outboard outermost surface 86. The innermost surface 84 is closer to the fan blades 70, and the outermost surface 86 is farthest away from the fan blades 70 in the radial direction.

The fan track liner 72 is positioned between the barrel 68 and the fan blades 70 and is immediately outboard of the fan blades 70. The fan track liner 72 may be abradable and can be constructed in a variety of manners and can be made of one or more materials such as metallic, plastic, composite, honeycomb, or others known in the art. For example, the fan track liner 72 can be constructed as a single article or as an article that has portions fastened or bonded to one another in the form of a layered composition. The fan track liner 72 can be cast, stamped, molded, or made in a composite construction. In short, the fan track liner 72 can take on any variety of constructions.

To prevent a potential failure of gas turbine engines, the stability and structural integrity of the barrel 68 is of great concern. In place of different kinds of metals, a carbon fiber composite 88 (carbon composite) is used as a component of the barrel 68. This provides for a reduction in the overall of weight of the fan case 60 and also maintains the structural integrity and strength of the barrel 68. The carbon composite 88 may be formed from layers of carbon fiber combined with epoxy resin. One of the desirable physical characteristics of the carbon composite 88 is that it can catch and hold a penetrating projectile such as a portion of the fan blade 70 in the FBO event. Another component is poly p-phenylene-2,6-benzobisoxazole commonly known as (PBO) 90 that is also provided in the barrel 68 and has a number of desirable characteristics. The PBO is commonly known by the brand name of Zylon®. The PBO may also be in a composite form combined with a polymer such as epoxy resin. Furthermore, the PBO 90 may be in a form of layers of fiber. One of the desirable characteristics of the PBO composite 90 is that it is resistant to cutting such that when the fan blade 70 or other fast moving high energy debris hits the PBO composite 90 the amount of cutting is minimized. Another desirable characteristic of the PBO composite 90 is that it has a lower density compared to other comparable fibers. Kevlar has been traditionally used in fan containment cases to resist cutting by a fan blade in the event of the FBO. Here, the incorporation of the PBO composite 90 as a component of the barrel 68 provides for a lighter weight fan case as well as increased resistance to cutting by a broken off high energy fan blade or other debris.

As described below, the barrel 68 includes a number of aspects in terms of different physical arrangements of the carbon composite 88 and the PBO composite 90 within the barrel 68. A common feature of the aspects of the barrel 68 disclosed herein is that a band of carbon composite 88 constitutes the outermost surface of the barrel 68. It should be noted that, as described hereinafter, a band signifies one or multiple layers of a material such as for example, carbon or PBO, therefore, the band of carbon composite includes one or multiple layers of carbon fibers or similarly the band of PBO composite 90 includes one or multiple layers of PBO fibers. In the aerospace industry, hardware such as machines, equipment, turbine engines or the like are manufactured for long-term use and must meet certification standards for extended operations. Therefore, it is crucial that the hardware withstand negative effects of mechanical and physical as well as environmental impacts over the long-term. The PBO composite 90 is more susceptible to environmental degradation over time than the carbon composite 88. Thus, to protect and shield the PBO composite 90 from environmental degradation, it is embedded inside bands of carbon composite 88.

Figure 3:
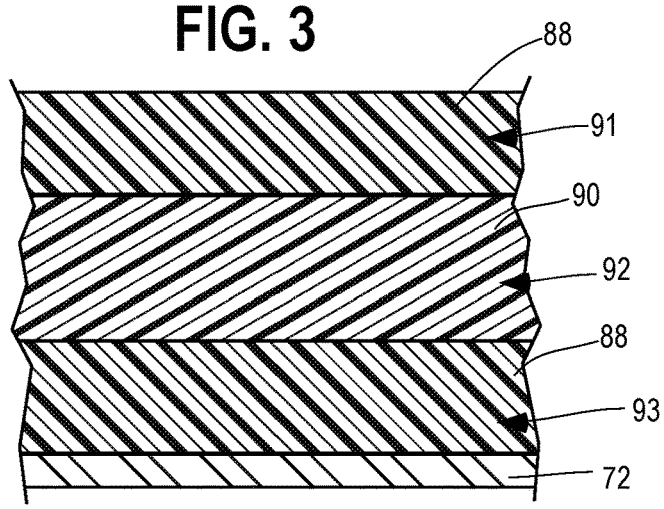
FIG. 3 depicts an enlarged, fragmentary, cross sectional view along a plane Y in FIG. 2 in a radial direction of a portion of a barrel having a three-band arrangement of carbon and PBO material where a carbon band of material is the innermost surface of the barrel according to a first aspect of the hardwall fan containment case.

Referring to FIG. 3, an enlarged, fragmentary, cross sectional view along the plane Y of the middle portion of the barrel 68 with the fan track liner 72 shows a three-band arrangement of the carbon and PBO within the barrel 68 as a first aspect of the fan case. In this arrangement, a first band 91 of carbon composite 88 provides the outermost surface of the barrel 68. Disposed immediately adjacent to the first band 91 of carbon composite 88 is a second band 92 of PBO composite 90 inboard of the fan case 60. A third band 93 of carbon composite 88 is disposed further inboard of the second band 92 of PBO composite 90 and as a result, the second band 92 of PBO composite 90 is fully surrounded by the first and third bands 91, 93 of carbon composite 88. It is known that exposure to humidity can cause degradation of the PBO composite over time. Therefore, by fully surrounding and encapsulating the PBO composite 90 with carbon composite 88 such that the PBO composite 90 is embedded within the carbon composite 88, the PBO composite 90 would be insulated from harsh environmental effects. Moreover, to further insulate and protect the PBO composite from environmental degradation, thicknesses of the bands of carbon composite 88 entombing the band of PBO composite 90 may be at least as thick as a thickness of the band of PBO composite 90. It should be noted that by making the thicknesses of the bands of carbon composites 88 substantially thicker than the thickness of the bands of PBO composite 90, the PBO composite 90 would be more fully entombed within the carbon composites 88 and as a result the PBO composite 90 would be even less subject to environmental degradation.

Figure 4:
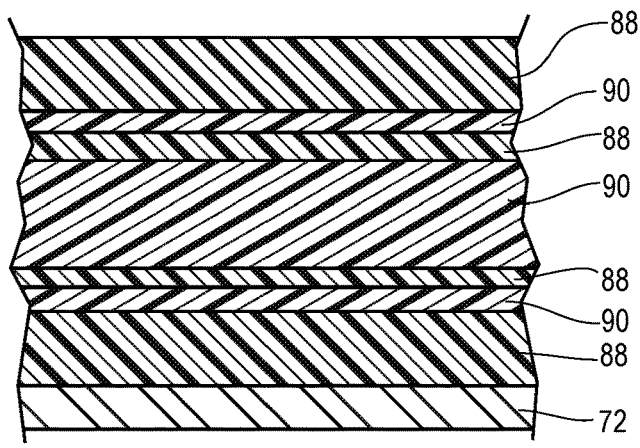
FIGS. 4-6 depict enlarged, fragmentary, cross sectional views along the plane Y in FIG. 2 of the portion of the barrel having more than three bands of carbon and PBO material according to variations of the first aspect of the hardwall fan containment case.
Figure 5:
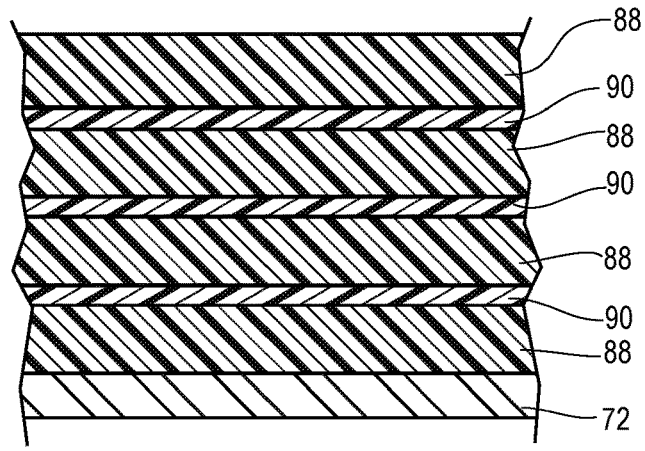
Figure 6:
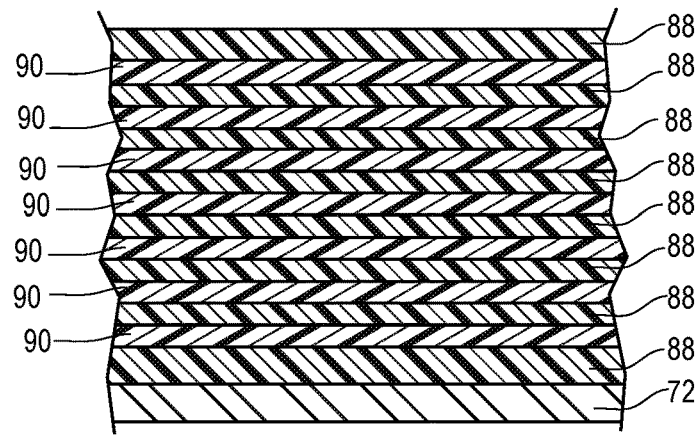

FIGS. 4-6, show several variations of the first aspect of the fan case as having more than three bands of carbon composite and PBO composite embedded within the carbon composite as components of the barrel 68. It should be noted that the innermost band closest to the fan blade 70 in all of these arrangements is a carbon composite band. Therefore, in the event of a FBO, the broken off fan blade 70 will initially come into contact with the band of carbon composite 88 that is the innermost band and cuts through the carbon fiber composite layers. The succeeding band of material is a band of PBO composite 90 that is fully entombed between the innermost carbon composite band and another band of carbon composite disposed outbound of the PBO composite band. The PBO layers of the band of PBO composite characteristically resist a cutting action by the broken off fan blade 70. As described above, the carbon composite layers of each band of carbon composite 88 insulate and protect the bands of PBO composite from degradation and also resist further penetration of a broken fan blade 70 by catching and holding the broken off blade 70 as the blade pushes through the barrel 68 in its trajectory.

Figure 7:
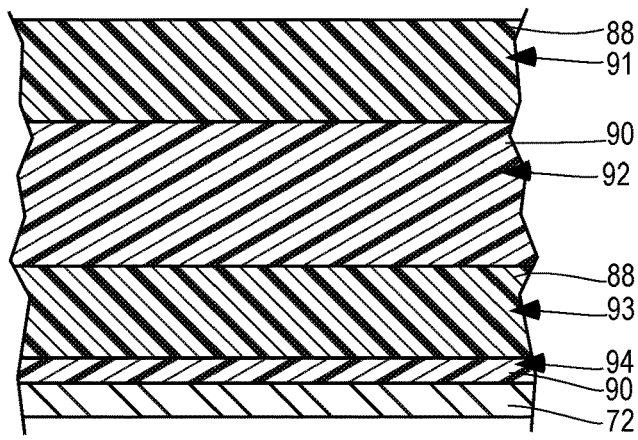
FIG. 7 depicts another enlarged, fragmentary, cross sectional view along the plane Y in FIG. 2 of the portion of the barrel having a four-band arrangement of carbon and PBO material where the PBO band of material is the innermost surface of the barrel according to a second aspect of the hardwall fan containment case.
Figure 8:
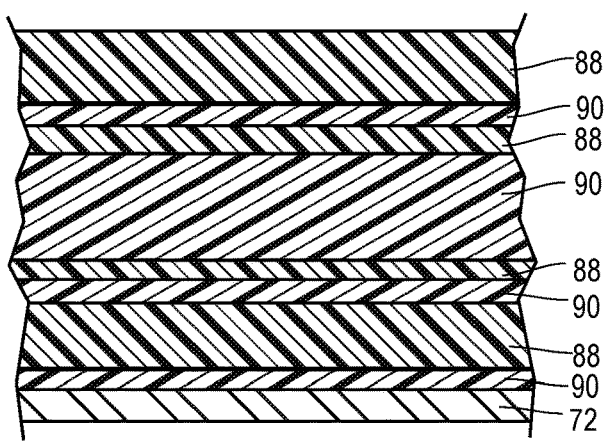
FIGS. 8-11 depict enlarged, fragmentary, cross sectional views along the plane Y in FIG. 2 of the portion of the barrel having more than four bands of carbon and PBO material according to variations of the second aspect of the hardwall fan containment case.
Figure 9:
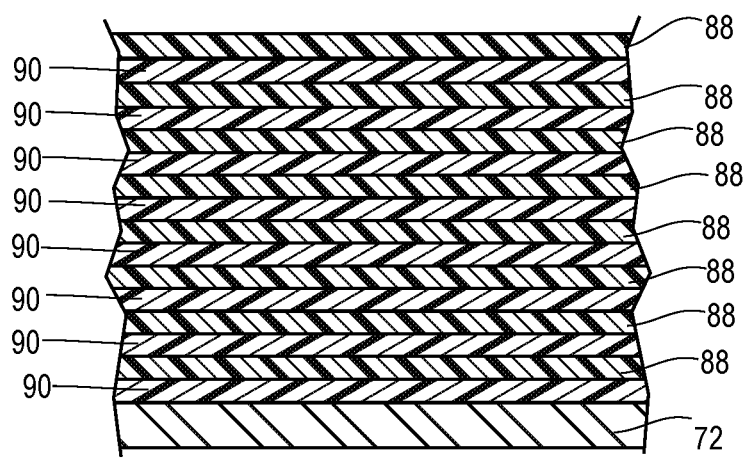
Figure 10:
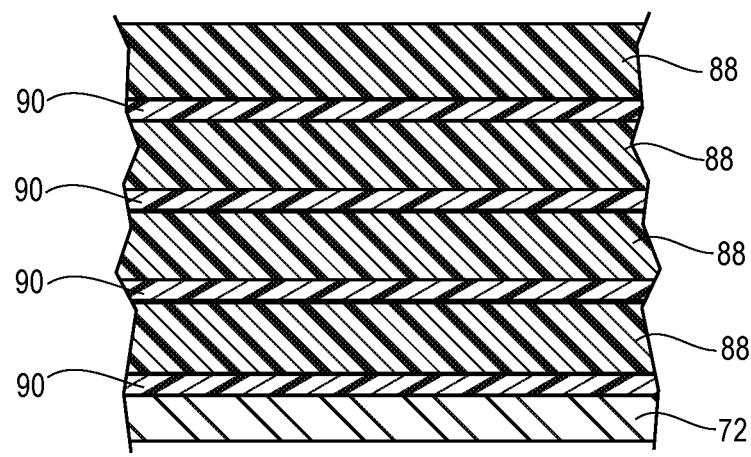
Figure 11:
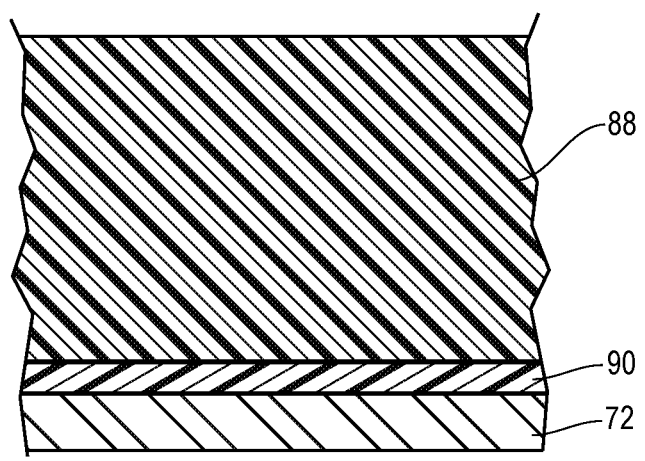

Referring to FIG. 7, another enlarged, fragmentary, cross sectional view of the middle portion of the barrel 68 and the fan track liner 72 shows a four-band arrangement of the carbon and PBO as components of the barrel 68. In this arrangement, in contrast with the arrangement shown in FIG. 3, a fourth band 94 of PBO composite 90 material is disposed as the innermost surface of the barrel 68 closest to the fan blade (not shown). In this arrangement, although the PBO composite that is the innermost surface of the barrel 68 may be subject to degradation, however, another band of PBO composite 90 disposed further outboard is protected against degradation by being embedded between two bands of carbon composite material.

Referring to FIGS. 8-11, several variations of the second aspect as having more than four bands of carbon composite and PBO composite embedded within the carbon composite are shown. It should be noted that the innermost band closest to the fan blade 70 in each of these arrangements is a PBO composite band. Therefore, in the event of an FBO, the broken off fan blade will initially come into contact with the innermost band of PBO composite. The cutting action of broken off fan blade is resisted by the PBO composite layers. The next and succeeding band of material in the arrangements shown in FIGS. 8-11 is a band of carbon composite. The carbon layers of the band of carbon composite characteristically catch the broken off fan blade and impede the penetrating motion of the broken off fan blade as it pushes to penetrate the barrel 68.

Figure 12:
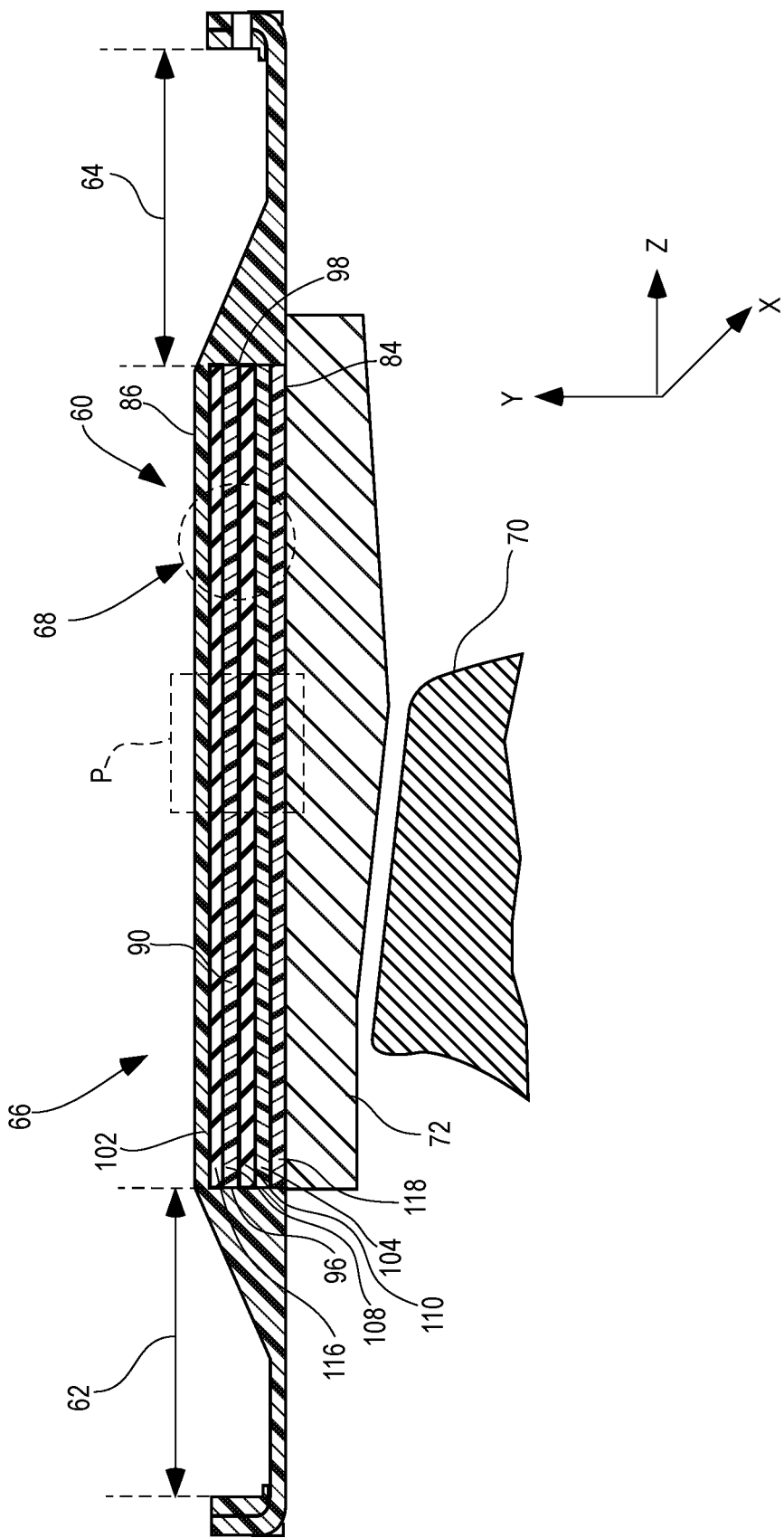
FIG. 12 depicts a cross sectional detailed view of a second embodiment of the hardwall fan containment case of FIG. 1.

Referring to FIG. 12, a second embodiment of the fan case 60 includes a barrel 68 that comprises an outermost portion 102, an innermost portion 104, and an interior portion 106 (See FIGS. 13-16) between the outermost portion 102 and the innermost portion 104. The interior portion 106 comprises the PBO 90 and other materials, namely, at least one of a para-aramid and meta-aramid material. The para-aramid material is commonly known as Kevlar® and the meta-aramid is commonly known as Nomex®. The Kevlar/Nomex, for example, in the disclosed second embodiment, have a cellular foam structure which may be in a form of a honeycomb. The utilization of the honeycomb structure allows for a desired reduction in a total weight of the barrel 68 and the fan case 60. The Kevlar/Nomex material characteristically crush which absorbs energy when impacted by a high energy projectile such as the broken-off fan blade 70 in the gas turbine engine. The PBO 90 forms a first interior band 108 and the Kevlar/Nomex honeycomb disposed adjacent to the PBO 90 forms a second interior band 110 of the interior portion 106. The outermost portion 102 includes an outermost band 112 and the innermost portion 104 includes an innermost band 114. (See FIGS. 13-16) The outermost band 112 and the innermost band 114 are made of carbon fiber composite layers, which provide strength and stability to the structure of the barrel 68.

FIGS. 13-15, depict an enlarged, fragmentary, cross sectional view along the plane P of the middle portion of the barrel 68 with variations of a three-portion arrangement of the outermost, innermost, and interior portions of the barrel 68. For example, in a first variation as seen in FIG. 13, the second interior band 110 made of Kevlar/Nomex honeycomb provides a separation between the carbon fiber composite material of the innermost band 114 and the PBO 90 of the first interior band 108. The PBO 90 of the first interior band 108 is not directly attached to the innermost band 114 but is instead contained through a layer of Kevlar/Nomex honeycomb. During FBO, the Kevlar/Nomex honeycomb is crushed and cut through, and provides a volume that allows the broken-off fan blade 70 to penetrate into the volume prior to a contact with the PBO 90 layer. Some of the benefits of not having the PBO layer be affixed to the innermost layer and permitting the blade to traverse the crushable layer before coming into contact with the PBO 90 is that not only the blade energy is reduced before reaching the PBO 90, but also as the PBO 90 prevents a cutting action, there is a space created to allow the fan blade to move in the circumferential X direction. Some of the energy of the broken-off fan blade 70 in the radial Y direction is translated or directed into primarily the circumferential X direction and secondarily into the axial Z direction. In this manner, a radially outboard penetration of the broken-off fan blade 70 toward the outermost portion 102 of the barrel 68 is markedly reduced.

In a second variation shown in FIG. 14, the honeycomb structure of the third interior band 116 is outboard from the first interior band 108. The honeycomb structure of the third interior band 116 is crushable and provides a cushion between the first interior band 108 and the outermost band 112 of the outermost portion 102. The PBO 90 of the first interior band 108 is thus enabled to elongate in the radial Y direction in the event of FBO in a greater amount than if it was supported outboardly by a solid laminate of carbon layer. Additionally, any penetrating amount of the broken-off fan blade 70 that may potentially cut through the PBO 90 of the first interior band 108 in the radially outboard direction has to traverse a thickness of the crushable third interior band 116 and will be, thereby, slowed by the crushable third interior band 116. The third interior band 116 minimizes any amount of deflection of the carbon fiber composite material that makes up outermost portion 102 of the barrel 68 and maintains the overall structural integrity of the fan case 60.

A third variation, as seen in FIG. 15, is a combination of the first and second variations described above. The interior portion 106 includes the first interior band 108 embedded and disposed between the second and the third interior bands 110, 116. In this arrangement, the separation provided by the honeycomb structure of the second interior band 110 allows the PBO 90 of the first interior band 108 to direct the radial energy of the broken-off fan blade 70 into primarily the circumferential X direction and secondarily the axial Z direction. Any remaining amount of radial penetration of the broken-off blade 70 through the PBO 90 of the first interior band 108 is captured and reduced by the crushable honeycomb structure of the third interior band 116 of Kevlar/Nomex material. Therefore, the combination of the features provided by the first and second variations in the third variation further buttress the structural effectiveness of the barrel 68 in reducing or eliminating the penetration of the broken-off fan blade 70 through the fan case 60.

Referring to FIG. 16, an additional inboard layer 118 made of PBO 90 is disposed inboard of the innermost portion 104 to provide further resistance to the cutting imparted on the barrel 68 by the broken-off fan blade 70 and also more fully ensure that the broken-off fan blade 70 does not penetrate or deflect the outermost portion 102 of the barrel 68. In connection with the embodiments described above, the carbon fiber composite material in the barrel 68 provides structural stability as well as the desired insulation of the PBO 90 from environmental degradation.

Referring again to FIGS. 2 and 12, it is seen that the forward, middle, and aft portions 62, 66, and 64 of the barrel 68 extend along an axial extent (Z-direction). The forward portion 62 and the aft portion 64 are thinner in cross section in relation to the middle portion 66. In the design of the turbine engine, the location of the middle portion 66 is determined based on the position of the fan blades 70 in the turbine engine such that in a FBO event a projected path taken by the broken off fan blade 70 would coincide with an impact zone on the middle portion 66. Therefore, as the broken off fan blade impacts the middle portion 66 the bands of carbon composite catch and the bands of PBO composite resist cutting of the barrel 68. As seen in FIGS. 2 and 12, the thickness of each of the forward portion 62 and the aft portion 64 is reduced with distance away from the middle portion 66. Each band of PBO composite material is disposed within and confined to the middle portion 66 and does not extend axially into the thinner forward and aft portions 62 and 64. A forward edge 96 and an aft edge 98 of each band of PBO composite material are within the middle portion 66 so that they are not degraded because of the reduction in thickness of the carbon composite material in the forward portion 62 and the aft portion 64.

It should be noted that an overall thickness of the barrel 68 is determined based on several variables such as a value of mass of the fan blade 70 and a rotational speed and/or acceleration of the fan blade 70 of a particular gas turbine engine. As these variables are changed depending on the type and design requirements of the different turbine engines, the amount of momentum and force generated by a broken off fan blade would be changed accordingly. Consequently, for fan blades 70 that produce larger momentum or force, the overall thickness of the barrel 68 would be larger compared to circumstances where the fan blades 70 produce smaller momentum or force. The various aspects described above and shown in FIGS. 3-11 and 13-16 demonstrate alternative arrangements in terms of the number of bands of carbon composite and PBO composite as well as the respective thicknesses of each of the bands of carbon composite and PBO composite that are determined based on the amount of momentum and force generated by the fan blades 70 in different turbine engines.

It should be noted that in the disclosed second embodiment shown in FIGS. 12-16, the variations of the physical arrangements of the Keviar/Nomex with respect to the PBO 90 as part of the interior portion 106 provide a softwall effect within a hardwall barrel 68.

It should be noted that in some circumstances in place of the PBO composite, a dry PBO material may be utilized. A dry PBO may provide certain benefits such as, for example, an improved elongation to failure characteristic because it would not be constrained in the absence of a resin matrix. Therefore, alternatively, dry PBO patches may be included and encapsulated in pockets within the barrel 68 to improve the elongation to failure feature of the PBO with minimal effect on the structural stability of the barrel 68. The PBO composite infused with polymer such as epoxy contributes to the structural strength and stability of the barrel 68. It should be noted that a determination of as to whether to provide either the dry PBO or PBO composite separately or in combination interleaved between layers of the carbon composite 88 depends on the desired application of the barrel 68 in the turbine engine 50.

The design options for the fan containment case 60 as described herein is not limited to any specific application and may be used, for example, with military, commercial aircrafts, naval vessels or other applications.

INDUSTRIAL APPLICABILITY

As provided herein, the fan containment case may be employed in connection with a gas turbine engine, and more specifically, for example, a gas turbine engine intended to be used in a military aircraft. The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

I claim:

1. A fan containment case for a gas turbine engine comprising:
   a barrel comprising an outermost portion, an innermost portion, and an interior portion in-between the outermost portion and the innermost portion;
   an outermost band of material of the outermost portion, wherein the outermost band is made of carbon fiber composite;
   a first interior band, a second interior band, and a third interior band of the interior portion, wherein the first interior band is disposed between and adjacent to the second and third interior bands, wherein the first interior band is made of poly p-phenylene-2,6-benzobisoxazole (PBO) and the second and third interior bands are made of an aramid material; and
   an innermost band of material of the innermost portion, wherein the innermost band is made of carbon fiber composite;
   wherein the second interior band is adjacent the outermost band and the third interior band is adjacent the innermost band.

2. The fan containment case of claim 1, wherein the second and third interior bands are made of one of a para-aramid and meta-aramid material.

3. The fan containment case of claim 2, wherein the second and third interior bands comprise a honeycomb structure.

4. The fan containment case of claim 1, wherein a thickness of the first interior band is substantially less than a thickness of the innermost band and a thickness of the outermost band.

5. The fan containment case of claim 1, wherein the innermost band of the innermost portion comprises a first innermost band and the innermost portion further comprises a second innermost band made of PBO, and wherein the first innermost band is embedded and disposed between the interior portion and the second innermost band.

6. The fan containment case of claim 1, wherein the barrel includes along an axial extent thereof a forward portion, a middle portion, and an aft portion, and wherein the forward portion and the aft portion are thinner than the middle portion.

7. The fan containment case of claim 6, wherein each of the forward portion and the aft portion is reduced in thickness with distance away from the middle portion, and wherein the interior portion is disposed in the middle portion of the barrel.

8. The fan containment case of claim 6, wherein each of the outermost portion, the interior portion, and the innermost portion is selectively located in a projected path of a fan blade-out such that a failed blade of the gas turbine engine is adapted to be impacted onto the selected location of the outermost, interior, and innermost portions.

9. The fan containment case of claim 2, wherein the outermost band and the innermost band each comprises multiple layers of carbon fiber composite, and wherein the first interior band comprises multiple layers of PBO composite.

10. A gas turbine engine, comprising:
    a fan containment case including a barrel comprising an outermost portion, an innermost portion, and an interior portion in-between the outermost portion and the innermost portion;
    an outermost band of material of the outermost portion, wherein the outermost band is made of carbon;
    a first interior band, a second interior band, and a third interior band of the interior portion, wherein the first interior band is disposed between and adjacent to the second and third interior bands, wherein the first interior band is made of poly p-phenylene-2,6-benzobisoxazole (PBO) and the second and third interior bands are made of an aramid material; and
    an innermost band of material of the innermost portion, wherein the innermost band is made of carbon;
    wherein the second interior band is adjacent the outermost band and the third interior band is adjacent the innermost band.

11. The gas turbine engine of claim 10, wherein the second and third interior bands are made of one of a para-aramid and meta-aramid material.

12. The gas turbine engine of claim 11, wherein the second and third interior band comprise bands comprise a honeycomb structure.

13. The gas turbine engine of claim 12, wherein the outermost band and the innermost band each comprises multiple layers of carbon fiber composite, and wherein the first interior band comprises multiple layers of dry PBO.

14. The gas turbine engine of claim 13, wherein a thickness of the first interior band is substantially less than a thickness of the innermost band and a thickness of the outermost band.

15. The gas turbine engine of claim 13, wherein the innermost band comprises a first innermost band and the interior portion further comprises a second innermost band made of PBO, and wherein the first innermost band is embedded and disposed between the interior portion and the second innermost band.

16. The gas turbine engine of claim 10, wherein the barrel includes along an axial extent thereof a forward portion, a middle portion, and an aft portion, wherein the forward portion and the aft portion are thinner than the middle portion, wherein each of the forward portion and the aft portion is reduced in thickness with distance away from the middle portion, and wherein the interior portion is disposed in the middle portion of the barrel.

17. The gas turbine engine of claim 16, wherein a thickness of each of the outermost and innermost bands is at least as thick as a thickness of the interior portion.

18. The gas turbine engine of claim 15, wherein each of the outermost portion, the interior portion, and the innermost portion is selectively located in a projected path of a fan blade-out such that a failed blade of the gas turbine engine is adapted to be impacted onto the selected location of the outermost, interior, and innermost portions.

* * * * *